US012591380B2

(12) United States Patent
Kim et al.

(10) Patent No.: US 12,591,380 B2
(45) Date of Patent: Mar. 31, 2026

(54) STORAGE DEVICE AND OPERATING METHOD THEREOF

(71) Applicant: Samsung Electronics Co., Ltd., Suwon-si (KR)

(72) Inventors: Heesung Kim, Suwon-si (KR); Hyunwook Shin, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/422,316

(22) Filed: Jan. 25, 2024

(65) Prior Publication Data

US 2025/0013371 A1     Jan. 9, 2025

(30) Foreign Application Priority Data

Jul. 7, 2023     (KR) ........................ 10-2023-0088450

(51) Int. Cl.
*G06F 3/06* (2006.01)
(52) U.S. Cl.
CPC .......... *G06F 3/0625* (2013.01); *G06F 3/0659* (2013.01); *G06F 3/0679* (2013.01)
(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS

| | | | |
|---|---|---|---|
| 7,136,958 B2 | 11/2006 | Jeddeloh | |
| 8,343,853 B2 * | 1/2013 | Koo ...................... | H01L 31/068 |
| | | | 257/E21.318 |

(Continued)

FOREIGN PATENT DOCUMENTS

| | | |
|---|---|---|
| JP | 2016-006655 A | 1/2016 |
| JP | 5968508 B2 | 8/2016 |

(Continued)

OTHER PUBLICATIONS

J. Yamada, "Selector-line merged built-in ECC technique for DRAMs," in IEEE Journal of Solid-State Circuits, vol. 22, No. 5, pp. 868-873, Oct. 1987, doi: 10.1109/JSSC.1987.1052826. (Year: 1987).*

(Continued)

*Primary Examiner* — Daniel C. Chappell
(74) *Attorney, Agent, or Firm* — Harness, Dickey & Pierce, P.L.C.

(57)     ABSTRACT

A storage device includes a first non-volatile memory device storing a data; a first selector connected to the first non-volatile memory device; a plurality of channels connected to the first selector; and a memory controller connected to the plurality of channels, transmitting a command for sensing a state of a channel to the plurality of channels in order to transmit the data to the first non-volatile memory device, receiving a channel state signal indicating whether each channel is in an idle state or not from the plurality of channels as a response to the command, selecting a first channel among the plurality of channels based on the channel state signal, and outputting a channel selection signal including an information of the first channel to the first selector so that the first selector connects the first channel and the first non-volatile memory device.

18 Claims, 14 Drawing Sheets

(58) Field of Classification Search

CPC .............. G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2003/0697; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | | |
|---|---|---|---|---|---|
| 8,352,675 | B2 * | 1/2013 | Jung | .................... | G06F 3/0605 |
| | | | | | 711/E12.001 |
| 8,681,546 | B2 | 3/2014 | Fai et al. | | |
| 8,717,828 | B2 | 5/2014 | Kim et al. | | |
| 9,251,863 | B2 | 2/2016 | Kim et al. | | |
| 10,140,223 | B2 | 11/2018 | Chun | | |
| 10,915,470 | B2 * | 2/2021 | Kim | ........................ | G06F 13/24 |
| 11,507,307 | B2 * | 11/2022 | Shimada | ............... | G06F 3/0604 |
| 11,561,919 | B2 * | 1/2023 | Kim | .................... | G06F 13/4022 |
| 2002/0041522 | A1 * | 4/2002 | Klein | .................. | G11C 11/4096 |
| | | | | | 365/189.05 |
| 2005/0050255 | A1 | 3/2005 | Jeddeloh | | |
| 2010/0148310 | A1 * | 6/2010 | Koo | ...................... | H10F 71/128 |
| | | | | | 257/617 |
| 2011/0276740 | A1 * | 11/2011 | Joo | ........................ | G06F 13/385 |
| | | | | | 711/E12.082 |
| 2012/0072755 | A1 * | 3/2012 | Jun | ........................ | G06F 1/3221 |
| | | | | | 713/340 |
| 2012/0137040 | A1 | 5/2012 | Kim et al. | | |
| 2012/0215958 | A1 | 8/2012 | Fai et al. | | |
| 2014/0241024 | A1 | 8/2014 | Kim et al. | | |
| 2017/0371812 | A1 | 12/2017 | Chun | | |
| 2020/0026669 | A1 | 1/2020 | Kim et al. | | |
| 2020/0293466 | A1 * | 9/2020 | Calder | ................ | G06F 13/4282 |
| 2020/0401346 | A1 | 12/2020 | Shimada et al. | | |
| 2021/0064295 | A1 * | 3/2021 | Yu | ......................... | G06F 3/0652 |
| 2021/0117114 | A1 | 4/2021 | Cho | | |
| 2022/0050800 | A1 | 2/2022 | Kim | | |

FOREIGN PATENT DOCUMENTS

| | | | |
|---|---|---|---|
| KR | 10-1854251 | B1 | 5/2018 |
| KR | 10-1952562 | B1 | 2/2019 |

OTHER PUBLICATIONS

P.-Y. Chen and S. Yu, "Impact of vertical RRAM device characteristics on 3D cross-point array design," 2014 IEEE 6th International Memory Workshop (IMW), Taipei, Taiwan, 2014, pp. 1-4, doi: 10.1109/IMW.2014.6849382. (Year: 2014).*

Extended European Search Report dated Jun. 20, 2024 for corresponding European Application No. 24152613.6.

* cited by examiner

STORAGE DEVICE AND OPERATING METHOD THEREOF

CROSS-REFERENCE TO RELATED APPLICATION

This application claims priority to and the benefit of Korean Patent Application No. 10-2023-0088450 filed in the Korean Intellectual Property Office on Jul. 7, 2023, the entire contents of which are incorporated herein by reference.

BACKGROUND OF THE DISCLOSURE

The present disclosure relates to storage devices and operating methods of the storage devices.

A storage device is a device that stores a data under a control of a host device such as a computer, a smart phone, or a smart pad. The storage device may include a device that stores a data on a magnetic disk, such as a hard disk drive (HDD, Hard Disk Drive), and a device that stores a data in a semiconductor memory, particularly a non-volatile memory, such as a solid state drive (SSD) and a memory card.

In the storage device, the memory controller may check the status of the non-volatile memory device such as a ready/busy for each of the plurality of non-volatile memory devices in order to control the plurality of non-volatile memory devices in the storage device. In addition, the memory controller may transmit a plurality of commands and data for performing read and write operations to a plurality of non-volatile memory devices. In this case, the memory controller may include a scheduling module that schedules the transmission order of the plurality of commands according to a command scheduling method in order to efficiently transmit the plurality of commands.

Meanwhile, the plurality of channels connected to the memory controller may output signals corresponding to the plurality of commands and data transmitted from the memory controller in order to control the operation of the plurality of non-volatile memory devices. Since a plurality of non-volatile memory devices are fixedly connected to each channel, a timing loss occurs when a traffic increases in the plurality of memories connected to one channel.

SUMMARY OF THE DISCLOSURE

The present disclosure is intended to increase utilization of channels while maintaining the size of the channels in the storage device.

The present disclosure is for implementing channel interleaving of the storage devices.

The present disclosure is to reduce a timing loss of the storage device.

A storage device according to some example embodiments includes a first non-volatile memory device storing a data; a first selector connected to the first non-volatile memory device; a plurality of channels connected to the first selector; and a memory controller connected to the plurality of channels, configured to transmit a command for sensing a state of a channel to the plurality of channels in order to transmit the data to the first non-volatile memory device, receive a channel state signal indicating whether each channel is in an idle state or not from the plurality of channels as a response to the command, select a first channel among the plurality of channels based on the channel state signal, and output a channel selection signal including an information of the first channel to the first selector so that the first selector connects the first channel and the first non-volatile memory device.

A storage device according to some example embodiments includes a plurality of channels; a plurality of non-volatile memory devices; and a first selector connected to a first non-volatile memory device corresponding among the plurality of non-volatile memory devices, configured to receive a first signal from an external memory controller, and connect a first channel among the plurality of channels and the first non-volatile memory device based on the first signal.

An operating method of a storage device according to some example embodiments includes determining, by a memory controller, to transmit a data to a first non-volatile memory device among a plurality of non-volatile memory devices based on a scheduling scheme; for transmitting the data to the first non-volatile memory device, selecting a channel through which the data is transmitted among the plurality of channels connected to the memory controller, and outputting a channel selection signal including an information of the selected channel; and receiving the channel selection signal by a first selector connected to the first non-volatile memory device, and connecting a channel corresponding to the channel selection signal and the first non-volatile memory device based on the channel selection signal.

BRIEF DESCRIPTION OF THE DRAWINGS

FIG. 1 is a block diagram showing a storage device.

FIG. 6 is a timing diagram showing an enable signal, a ready/busy signal, and a data signal of a non-volatile memory device during a read operation according to a comparative example.

FIG. 7 is a timing diagram illustrating a channel enable signal, an enable signal of a non-volatile memory device, a ready/busy signal, and a data signal during a read operation according to some example embodiments.

FIG. 8 is a timing diagram showing an enable signal, a ready/busy signal, and a data signal of a non-volatile memory device during a write operation according to a comparative example.

DETAILED DESCRIPTION

Figure 2:
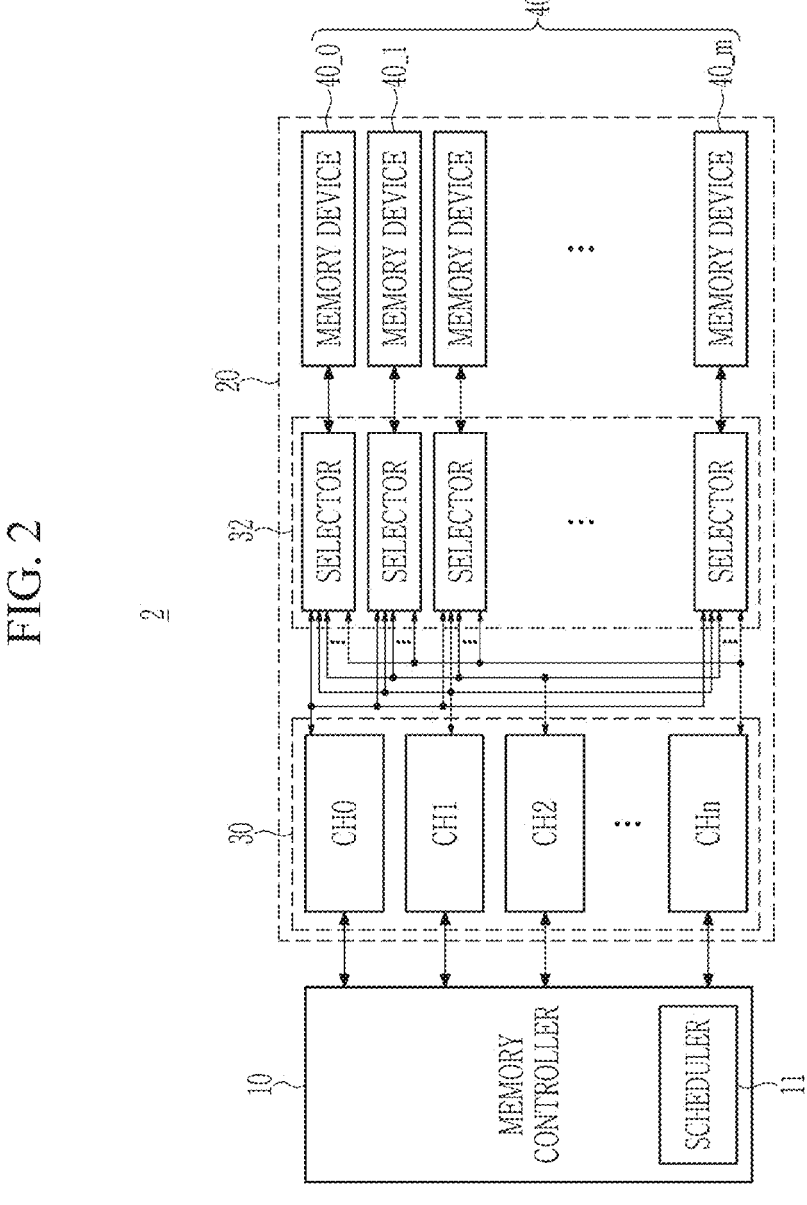
FIG. 2 is a block diagram showing a storage device according to some example embodiments.

In the following detailed description, only some example embodiments of the present disclosure have been shown and described, simply by way of illustration. As those skilled in the art would realize, the described example embodiments may be modified in various different ways, all without departing from the spirit or scope of the present disclosure.

Accordingly, the drawings and description are to be regarded as illustrative in nature and not restrictive. Like reference numerals designate like elements throughout the specification. In a flowchart described with reference to the drawings, an order of operations may be changed, several operations may be merged, some operations may be divided, and specific operations may not be performed.

In addition, expressions written in the singular may be construed in the singular or plural unless an explicit expression such as "one" or "single" is used. Terms including ordinal numbers such as first, second, and the like will be used only to describe various components, and are not to be interpreted as limiting these components. These terms may be used for the purpose of distinguishing one constituent element from other constituent elements.

Figure 1:
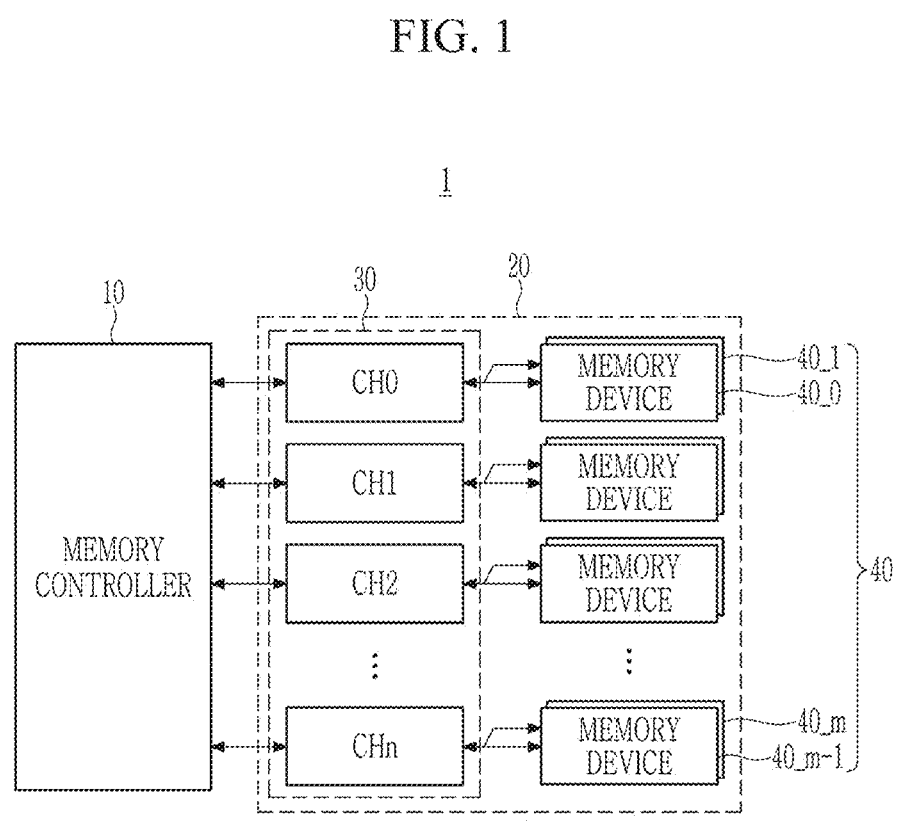

FIG. 1 is a block diagram showing a storage device.

Referring to FIG. 1, a storage device 1 may store a data or process a data in response to an instruction from a host. For example, the storage device 1 may be a solid state drive (SSD), smart SSD, embedded multimedia card (eMMC), embedded universal flash storage (UFS) memory device, UFS memory card, compact flash (CF), SD (Secure Digital), Micro Secure Digital (Micro-SD), Mini Secure Digital (Mini-SD), extreme Digital (xD) or memory stick.

The storage device 1 may include a memory controller 10 and a memory device 20. The memory controller 10 may control the operation of the storage device 1. For example, the memory controller 10 may control the operation of the plurality of non-volatile memory devices 40 through the plurality of channels 30 based on a request from the host. For example, upon receiving a command from the host, the memory controller 10 may control each of the plurality of non-volatile memory devices 40 through the plurality of channels 30 according to the received command.

The memory device 20 may include a plurality of channels 30 and a plurality of non-volatile memory devices 40_0, 40_1, . . . , 40_m. For example, the memory device 20 may include four or eight channels, and two or four non-volatile memory devices may be connected to each channel.

The plurality of channels 30 may be connected to the plurality of non-volatile memory devices 40 and the memory controller 10. The plurality of channels 30 may output a plurality of signals for controlling the operation of the plurality of non-volatile memory device 40 based on the command transmitted from the memory controller 10. The plurality of channels 30 may output signals corresponding to the commands transmitted from the memory controller 10 in order to control the operation of the plurality of non-volatile memory devices 40. The memory controller 10 may be connected to some of the plurality of non-volatile memory devices 40 or all of the plurality of non-volatile memory devices 40 through the plurality of channels 30.

Each of the plurality of non-volatile memory devices 40 may store data. In some example embodiments, each of the plurality of non-volatile memory devices 40 may be a non-volatile memory. In some example embodiments, the non-volatile memory may include a NAND flash memory. Also, in another embodiment, the non-volatile memory may include EEPROM (Electrically Erasable Programmable Read-Only Memory), PRAM (Phase Change Random Access Memory), ReRAM (resistive RAM), RRAM (Resistance Random Access Memory), NFGM (Nano Floating Gate Memory), PoRAM (Polymer Random Access Memory), MRAM (Magnetic Random Access Memory), FRAM (Ferroelectric Random Access Memory) or a memory similar thereto.

Each of the plurality of non-volatile memory devices 40 may perform a write operation, a read operation, and/or an erase operation under the control of the memory controller 10. For example, during the write operation, the non-volatile memory device 40 may receive a command, an address, and the data from the memory controller 10 through the plurality of channels 30 and perform the write operation. During the read operation, the non-volatile memory device 40 may receive the command and address from the memory controller 10 through the plurality of channels 30 and output the read data to the memory controller 10 through the plurality of channels 30.

However, since the plurality of non-volatile memory devices 40_0, and 40_1 are fixedly connected to each channel (e.g., CH0), when the traffic from the memory controller 10 to the plurality of non-volatile memory devices 40_0, and 40_1 increases, there is a problem of a timing loss. For example, since the memory controller 10 transmits the command to the first non-volatile memory device 40_0 and the second non-volatile memory device 40_1 through the first channel CH0, during the first channel CH0 transmits the command to first non-volatile memory device 40_0, the first channel CH0 cannot transmit the command to the second non-volatile memory device 40_1. This is the same also in the case when other channels (e.g., CH1, CH2, . . . , CHn) are not in use, that is, in an idle state.

The present disclosure relates to the storage device for increasing the utilization of the channel while maintaining the size of the channel. The storage device may further include a selector between the non-volatile memory device and the plurality of channels, and a channel interleaving may be implemented using the selector. As described above, there may be an effect of improving memory performance of the storage device 1. Alternatively, or additionally, as described above, because performance of the storage device 1, for example based on improving channel utilization and timing, has been improved, there may be an effect of improving the storage device 1 and memory performance, and thus device performance, improved power consumption by improving power utilization, and the like.

FIG. 2 is a block diagram showing a storage device according to some example embodiments.

Referring to FIG. 2, a storage device 2 according to some example embodiments may include a memory controller 10 and a memory device 20. Also, the memory device 20 may include a plurality of channels 30, a plurality of selector 32, and a plurality of non-volatile memory devices 40. FIG. 2 shows that the plurality of channels 30 and the plurality of selector 32 are included inside the memory device 20, but is not limited thereto, and the plurality of channels 30 and the plurality of selector 32 may be outside the memory device 20, or be positioned inside the memory controller 10.

In some example embodiments, the memory controller 10 may be connected to the plurality of channels 30, and the plurality of channels 30 may be connected to the plurality of selectors 32. Each selector may be connected to the plurality of channels 30, and each selector may be fixedly connected to each non-volatile memory device (40_0, 40_1, . . . , 40_m). In some example embodiments, each selector may connect one channel of the plurality of channels 30 to the non-volatile memory device (40_0, 40_1, . . . , 40_m) connected to the selector.

The memory controller 10 may include a scheduler 11. The memory controller 10 is described in detail in FIG. 3.

Figure 3:
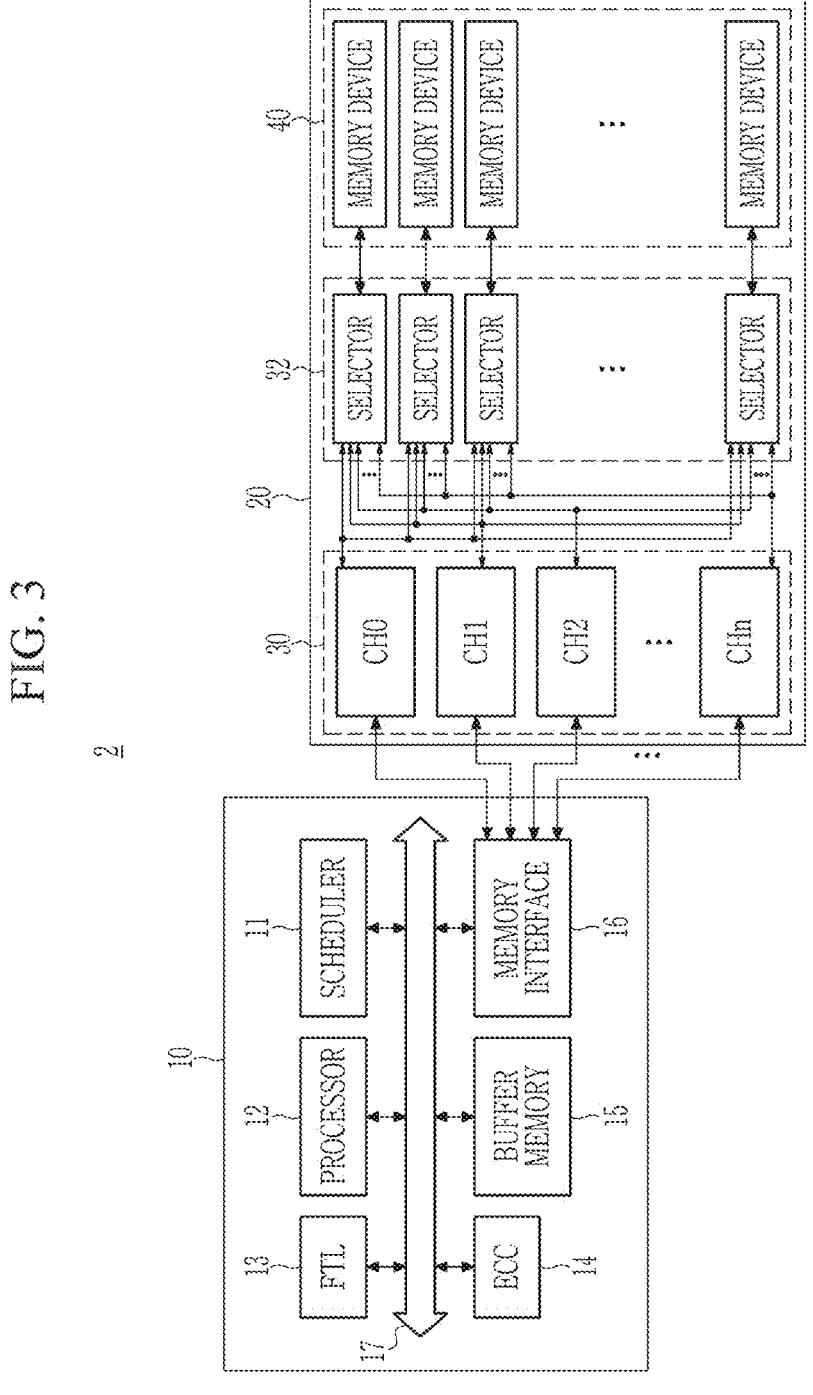
FIG. 3 is a view to illustrate a memory controller of FIG. 2.

FIG. 3 is a view to illustrate a memory controller of FIG. 2.

Referring to FIG. 3, the storage device 2 may include a memory controller 10 and a memory device 20, and the memory controller 10 may include a scheduler 11, a processor 12, a flash translation layer (FTL) 13, an error checking and correction (ECC) 14, a buffer memory 15, and a memory interface 16, bus 17, and the like.

The processor 12 may control the overall operation of the memory controller 10. The processor 12 may control the memory controller 10 by driving the firmware loaded in the FTL 13. In some example embodiments, the processor 12 may include a central processing unit (CPU), a controller, or an application specific integrated circuit (ASIC), or the like.

The flash transition layer (FTL) 13 may include a firmware or a software that manages a data read, write, and erase operations of the non-volatile memory device 40. The firmware in the FTL 13 may be executed by the processor 12.

The FTL 13 may perform an address mapping operation that converts a logical block address received from the host into a physical address used to actually store a data in the non-volatile memory device 40. For example, the FTL 13 may map the logical block address from the host and the physical address of the non-volatile memory device 40 by using an address mapping table. The address mapping operation may be an operation of converting or mapping between the logical block address managed by the host and the physical address of the non-volatile memory device 40.

The ECC 14 is an error correction unit, and may detect and correct errors included in the data read from the memory device 20.

The buffer memory 15 may store an instruction and a data executed and processed by the memory controller 10. The buffer memory 15 may temporarily store the data stored in the non-volatile memory device 40 or to be stored. The processor 12 may use the buffer memory 15 as a working memory of the processor 12.

The memory interface 16 may provide a signal transmission/reception with the memory device 20. The memory interface 16 may transmit the command to the memory device 20 along with the data to be written in the non-volatile memory device 16 or receive the data read from the memory device 20.

Also, the memory controller 10 may include the scheduler 11. When the host requests the read, write, and erase operations to the memory controller 10, in order to efficiently transmit the plurality of commands for performing the requested operation to the non-volatile memory device 40, the scheduler 11 may schedule the transmission order of the plurality of commands according to a predetermined (or, alternatively, desired or determined) command scheduling method. In some example embodiments, the command scheduling method may refer to schedule the command with reference to a priority of a command execution. The priority of the command execution may be determined based on the state of the non-volatile memory device to execute the command, but is not limited thereto.

The memory device 20 of the storage device 2 is described with reference to FIG. 4 and FIG. 5.

Figure 4:
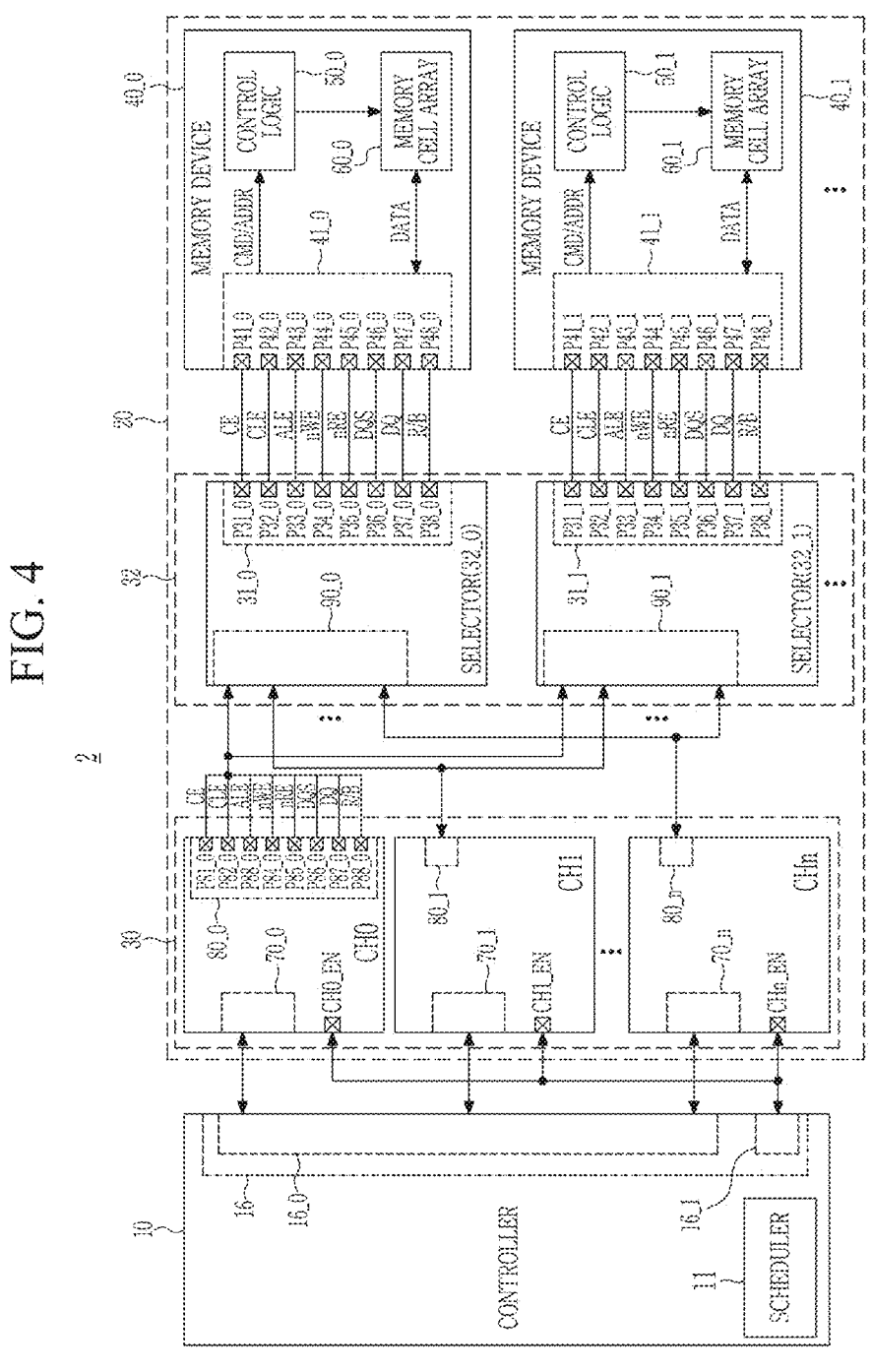
FIG. 4 is a view to illustrate a memory device of FIG. 2.

FIG. 4 is a view to illustrate a memory device of FIG. 2. FIG. 5 is a view to illustrate a selector in a memory device.

In some example embodiments, the memory device 20 may include a plurality of channels 30, a plurality of selector 32, and a plurality of non-volatile memory device 40. A command CMD, an address ADDR, and a data DATA output from a memory controller 10 may be transmitted to non-volatile memory devices 40_0, 40_1, . . . through channels CH0, CH1, . . . and selectors 32_0, 32_1, . . . in the memory device 20.

In some example embodiments, the memory controller 10 may transmit the command, the address, and the data for performing the read, write, and erase operations to the memory device 20 through the memory interface 16 according to the request of the host.

In some example embodiments, the memory interface 16 may include a signal transceiver 16_0 for transmitting the commands, the addresses, and the data to the memory device 20 and a channel signal detector 16_1 for receiving a channel signal CH_EN indicating a channel state. Also, the memory controller 10 may be connected to the plurality of selectors 32 through a data bus (not shown) inside the storage device 2.

In some example embodiments, the channel signal detector 16_1 may perform a channel state read operation for sensing the state of at least one channel among the plurality of channels 30. For example, the memory controller 10 may transmit the channel state command to at least one channel among 30 among the plurality of channels through the channel signal detector 16_1. As a response to the channel state command, at least one channel among the plurality of channels 30 may output the channel signal CH_EN indicating the state of the corresponding channel. For example, if the first channel CH0 is in use, that is, if the first channel CH0 is transmitting the command, the addresses, and the data to the first non-volatile memory device 40_0, the channel signal detector 16_1 may receive a channel signal CH0_EN (e.g., a low level) indicating that the first channel CH0 is in use from the first channel CH0. For example, if the second channel CH1 is not in use, that is, the second channel CH1 does not transit the command, the address, and the data to any non-volatile memory device, the channel signal detector 16_1 may receive a channel signal CH1_EN (e.g., a high level) indicating that the second channel CH1 is in an idle state from the second channel CH1.

In some example embodiments, the scheduler 11 may schedule a delivery order of a plurality of commands according to a predetermined (or, alternatively, desired or determined) command scheduling scheme. In some example embodiments, the command scheduling scheme may be determined based on the state of the non-volatile memory device 40. In some example embodiments, the scheduler 11 may determine the transmission order of the commands based on the ready/busy state of the non-volatile memory device 40. For example, when the host requests the memory controller 10 to perform the operation such as a reading or a writing, the memory controller 10 may check the status of the non-volatile memory device. That is, the memory controller 10 may perform a state read operation to check the state of the plurality of non-volatile memory devices 40. At this time, if the first non-volatile memory device 40_0 is a busy state and the second non-volatile memory device 40_1 is a ready state, the scheduler 11 may schedule the memory controller 10 to transmit the command to the second non-volatile memory device 40_1 first.

In some example embodiments, if the scheduler 11 determines the priorities of the commands based on the state of the non-volatile memory device 40, the memory controller 10 may transmit the commands and the data to the non-volatile memory device 40 through the channel 30 and the selector 32 according to the determined priorities. Hereinafter, the process of transmitting the commands and data from the memory controller 10 to the non-volatile memory device 40 through the channel 30 and the selector 32 will be described in detail.

In some example embodiments, if the channel signal detector 16_1 of the memory controller 10 transmits the channel state command to at least one channel among the plurality of channels 30, in response to this, at least one channel among the plurality of channels 30, at least one channel among the plurality of channels 30 may output the channel signal CH_EN representing the state of the corresponding channel. In some example embodiments, the memory controller 10 may select the channel CH0, CH1, . . . , CHn to transmit the command, the address, and the data to the non-volatile memory device 40 based on the channel signal CH_EN received by the channel signal detector 16_1. For example, if the channel signal detector 16_1 of the memory controller 10 receives the channel signal CH0_EN of high level indicating that the first channel CH0 is in an idle state, the memory controller 10 may use the first channel CH0 to transmit the command to the first non-volatile memory device 40_0.

In some example embodiments, the memory controller 10 may transmit the command, address, and data to the non-volatile memory device 40 through the channel 30 by using the selector 32. The structure and the operating method of the selector 32 is described further in detail with reference to FIG. 5.

Figure 5:
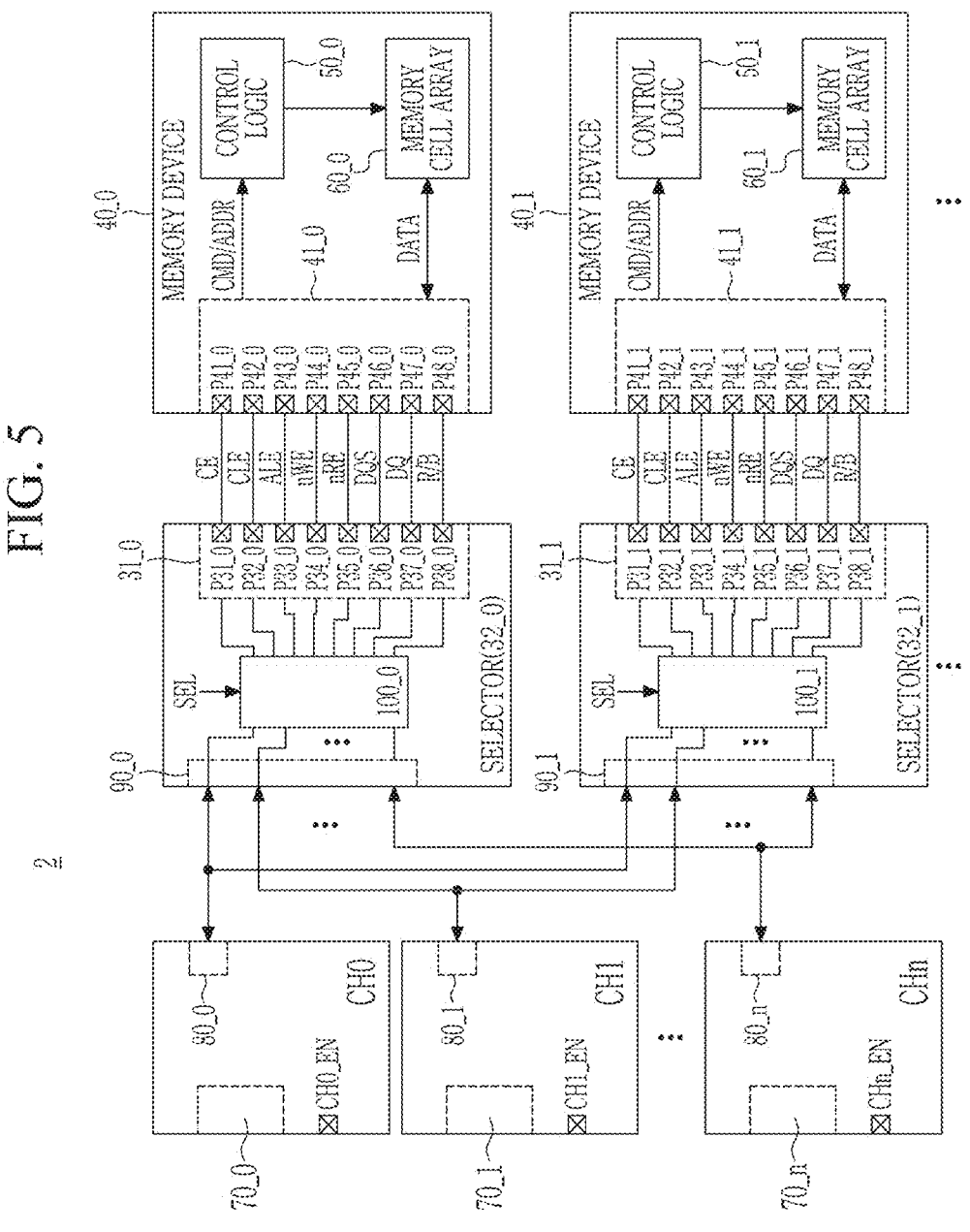
FIG. 5 is a view illustrating a selector according to some example embodiments.

Referring to FIG. 5, the selector 32 may be connected to each non-volatile memory device 40 and a plurality of channels CH. For example, the first selector 32_0 may include a first interface 90_0 including a plurality of pins for receiving signals corresponding to the command, address, and data from a plurality of channels CH0, CH1, . . . , CHn, and a second interface 31_0 including pins P31_0, . . . , P38_0 to transmit signals corresponding to the command, address, and data transmitted from the selected channel to the non-volatile memory device 40_0.

In some example embodiments, if the channel signal detector 16_1 of the memory controller 10 receives the channel signal CH_EN from the channel in an idle state, the memory controller 10 may transmit the channel selection signal SEL indicating the selection of the corresponding channel by the selector through a data bus inside the storage device 2. For example, when the channel signal detector 16_1 of the memory controller 10 receives the channel signal CH0_EN of high level indicating that the first channel CH0 is in an idle state, based on the channel signal CH0_EN, the memory controller 10 may transmit the channel selection signal SEL to the first selector 32_0 connected to the first non-volatile memory device 40_0 and instruct to connect the first non-volatile memory device 40_0 and the first channel CH0. The selection unit 100_0 of the first selector 32_0 may select the first channel CH0 among the plurality of channels 30 based on the channel selection signal SEL, and transmit the plurality of signals transmitted from the first channel CH0 through the plurality of pins P31_0, . . . , P38_0 to the first non-volatile memory device 40_0.

In some example embodiments, the storage device 2 including the selector 32 may increase a channel utilization while maintaining the channel size of the memory device 20. For example, as described above, when the memory controller 10 transmits the command, address, and data to first non-volatile memory device 40_0 through the first channel CH0, the memory controller 10 may further transmit the command to the second non-volatile memory device 40_1 based on the request from the host. When the memory controller 10 receives the request from the host, the memory controller 10 may transmit the channel state command to at least one channel among the plurality of channels 30 through the channel signal detector 16_1. The channel signal detector 16_1 may receive the channel signal CH1_EN indicating that the second channel CH1 is in an idle state from the second channel CH1 along with the channel signal CH0_EN indicating that the first channel CH0 is in use from first channel CH0. Based on the channel signal CH1_EN, the memory controller 10 may transmit the channel selection signal SEL to the second selector 32_1 connected to the second non-volatile memory device 40_1 and instruct to connect the second non-volatile memory device 40_1 and the second channel CH1. The selection unit 100_1 of the second selector 32_1 may select the second channel CH1 from among the plurality of channels 30 based on the channel selection signal SEL, and transmit the plurality of signals transmitted from the second channel CH1 to the second non-volatile memory device 40_1 through to the plurality of pins P31_1, . . . , P38_1. In this way, the storage device 2 including the selector 32 may implement the channel interleaving by increasing the utilization of the channel while maintaining the size of the channel. As described above, there may be an effect of improving memory performance and/or reducing a size of the storage device 1. Alternatively, or additionally, as described above, because size of the storage device 1, for example based on improving channel utilization and timing, has been reduced, there may be an effect of improving the storage device 1 and memory performance, and thus device performance, improved power consumption by improving power utilization, and the like.

Again, referring to FIG. 4, in some example embodiments, the plurality of channels 30 may include a controller interface 70 including a plurality of pins for receiving the command, address, and data to control the plurality of non-volatile memory device 40 from the memory controller 10. The plurality of channels 30 may include a selector interface 80 including a plurality of pins for transmitting a signal corresponding to the command, address, and data received from the memory controller 10 to the selector 32. The selector interface 80 may include a plurality of pins P81_0, . . . , P88_0 for transmitting and receiving signals with the plurality of non-volatile memory devices 40_0, 40_1, . . . .

In some example embodiments, the non-volatile memory device 40_0 may include a memory inner interface 41_0, a control logic 50_0, a memory cell array 60_0.

In some example embodiments, the memory inner interface 41_0 may receive the chip enable signal CE through the first pin P41_0. The chip enable signal CE may be a signal for indicating a specific non-volatile memory device 40_0 among the plurality of non-volatile memory devices 40 connected to the memory controller 10 by the memory controller 10.

In some example embodiments, the memory inner interface 41_0 in the non-volatile memory device 40_0 selected according to the chip enable signal CE may transmit and receive the signals with the memory controller 10 with the second pin P42_0, the third pin P43_0, the fourth pin P44_0, the fifth pin P45_0, the sixth pin P46_0, the seventh pin P47_0, and the eighth pin P48_0. For example, the memory inner interface 41_0 in the non-volatile memory device 40_0 receiving the chip enable signal CE of the enable state (e.g., a low level) may transmit and receive the signals with the memory controller 10 through the second to eighth pins P42 to 0-P48_0.

The memory inner interface 41_0 may receive a command latch enable signal CLE through the second pin P42_0.

The command latch enable signal CLE may be a signal instructed by the memory controller 10 to the non-volatile memory device 40_0 so that the command provided to the non-volatile memory device 40_0 through the seventh pin P47_0 is load to a command register of the non-volatile memory device 40_0. The command register may store the command received from the memory controller 10.

The memory inner interface 41_0 may receive the address latch enable signal ALE through the third pin P43_0.

The address latch enable signal ALE may be a signal directed by the memory controller 10 to the non-volatile memory device 40_0 so that the address provided to the non-volatile memory device 40_0 through the seventh pin P47_0 is loaded to the address register by the non-volatile memory device 40_0. The address register may store the address received from the memory controller 10.

The memory inner interface 41_0 may receive the writing enable signal nWE through the fourth pin P44_0.

The writing enable signal nWE may be a signal instructed by the memory controller 10 to the non-volatile memory device 40_0 so as to transmit the command, address, and data from the memory controller 10 to the non-volatile memory device 40_0.

The memory inner interface 41_0 may receive the reading enable signal nRE through the fifth pin P45_0.

The read enable signal nRE may be a signal instructed by the memory controller 10 to the non-volatile memory device 40_0 so as to transmit the data from the non-volatile memory device 40_0 to the memory controller 10.

The memory inner interface 41_0 may receive a data strobe signal DQS through the sixth pin P46_0.

The memory controller 10 or the non-volatile memory device 40_0 may receive the data signal DQs or transmit the data signal DQs in synchronization with the data strobe signal DQs.

The memory inner interface 41_0 may receive the data signal DQs through the seventh pin P47_0.

As described above, the data signal DQs may include the command, address, and data. In some example embodiments, the data signal DQs may be transmitted through a plurality of data signal lines.

FIG. 4 shows that the data signal DQs is transmitted and received through one seventh pin P47_0, but the present disclosure is not limited thereto, and the data signal DQs may be transmitted and received through a plurality of pins. Hereinafter, pins used to transmit and receive the data signal DQs are referred to as data pins. For example, the memory inner interface circuit 41_0 may include eight data pins to transmit and receive 8-bit data, and each of the plurality of pins may transmit and receive 1-bit data.

The memory inner interface 41_0 may output a ready/busy signal R/B through the eighth pin P48_0. The memory inner interface circuit 41_0 may transmit the state data of the non-volatile memory device 40_0 to the memory controller 10 through the ready/busy output signal R/B. At this time, the eighth pin P48_0 may be referred to as a state output pin of the non-volatile memory device 40_0.

The control logic 50_0 may overall control various operations of the non-volatile memory device 40_0. The control logic 50_0 may receive a command CMD and an address ADDR acquired from the memory inner interface 41_0. The control logic 50_0 may generate control signals for controlling other constituent elements inside the non-volatile memory device 40_0 according to the received command CMD and address ADDR. For example, the control logic 50_0 may generate various control signals for writing the data DATA to each memory cell array 60_0 or reading the data DATA from each memory cell array 60_0.

In some example embodiments, the memory cell array 60_0 may store the data DATA acquired from the memory inner interface circuit 41_0 under the control of the control logic 50_0. Each of the memory cell array 60_0 may output the stored data DATA to the memory inner interface circuit 41_0 under the control of the control logic 50_0.

The memory cell array 60_0 may include a plurality of memory cells. For example, the plurality of memory cells may be a flash memory cells. However, the present disclosure is not limited thereto, and the memory cells may be a resistive random access memory (RRAM) cell, a ferroelectric random access memory (FRAM) cell, a phase change random access memory (PRAM) cell, a thyristor random access memory (TRAM) cell, magnetic random access memory (MRAM) cells. Hereinafter, some example embodiments of the present disclosure will be described focusing on some example embodiments in which the memory cells are NAND flash memory cells.

Figure 6:
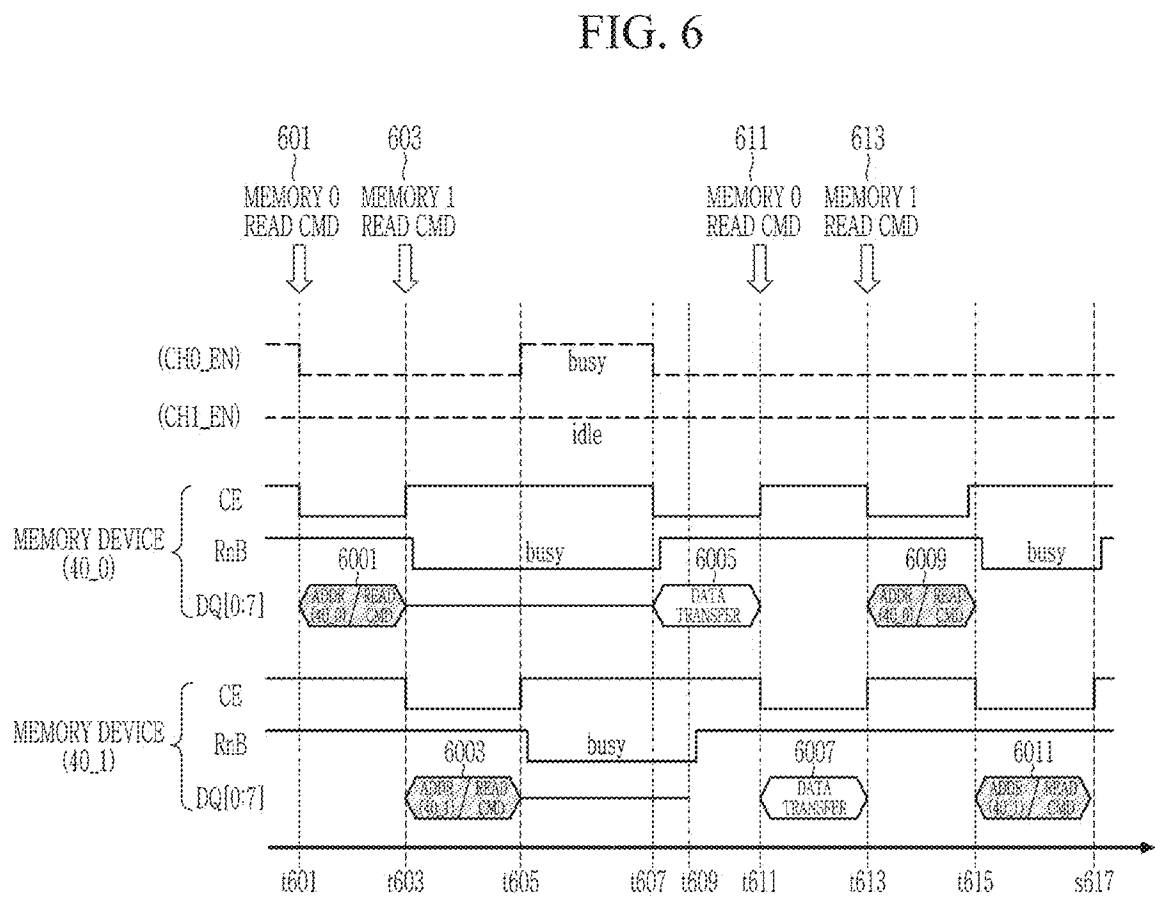

FIG. 6 is a timing diagram showing an enable signal, a ready/busy signal, and a data signal shown in a non-volatile memory device during a reading operation according to a comparative example.

For example, FIG. 6 is the timing diagram showing the enable signal, the ready/busy signal, and the data signal of the non-volatile memory device 40_0 and 40_1 according to the storage device of FIG. 1. Here, the channel signals CH0_EN and CH1_EN are shown for ease of understanding, hereinafter, the description of the non-volatile memory devices 40_0 and 40_1 may be equally applied to the non-volatile memory device 40_m.

First, at t601, if the host requests the memory controller 10 to perform a reading operation, the memory controller 10 may transmit a reading command 601 to the first non-volatile memory device 40_0 based on the state of the non-volatile memory device 40. If the memory controller 10 transmits the reading command to the first non-volatile memory device 40_0, the chip enable signal CE of the first non-volatile memory device 40_0 may be transitioned to an enable level (e.g., a low level).

In FIG. 1, since the first non-volatile memory device 40_0 is connected to the memory controller 10 of the first channel CH0, during the chip enable signal CE maintains the low level, the first channel CH0 may transmit the first command 6001 to the first non-volatile memory device 40_0 through the first data signal DQs based on the command of the memory controller 10. The first command 6001 may include an address ADDR and a reading command of the memory array in the first non-volatile memory device 40_0. While the first command 6001 is transmitted to the first non-volatile memory device 40_0 (t601 to t603), the first channel CH0 is in use. Accordingly, the channel signal CH0_EN may be transitioned to the low level.

At t603, the first non-volatile memory device 40_0 may perform an internal operation for preparing the data corresponding to the received first command 6001 in response to receiving the first command 6001. That is, at t603, the state signal RnB of the first non-volatile memory device 40_0 may be transitioned to a busy state (e.g., a low level), and the chip enable signal CE of the first non-volatile memory device 40_0 may be transitioned from a low level to a high level.

Meanwhile, at t603, if the host requests the memory controller 10 to perform the reading operation, the memory controller 10 may transmit the reading command 603 to the second non-volatile memory device 40_1 based on the state of the non-volatile memory device 40. If the memory controller 10 transmits the reading command to the second non-volatile memory device 40_1, the chip enable signal CE of the second non-volatile memory device 40_1 may be transitioned to an enable level (e.g., low level).

In FIG. 1, since the second non-volatile memory device 40_1 is connected to the memory controller 10 through the first channel CH0, while the chip enable signal CE maintains the low level, the first channel CH0 may transmit the second command 6003 to the second non-volatile memory device 40_1 through the second data signal DQs based on the command of the memory controller 10. While the second command 6003 is transmitted from the memory controller 10 to the second non-volatile memory device 40_1 (t603 to t605), the first channel CH0 is in use. Accordingly, the channel signal CH0_EN may be a low level.

At t605, the second non-volatile memory device 40_1 may perform an internal operation to prepare the data corresponding to the received second command 6003 in response to receiving the second command 6003. While the second non-volatile memory device 40_1 is performing an internal operation (t605 to t609), the state signal RnB of the second non-volatile memory device 40_1 may be transitioned to the busy state (e.g., the low level), since the first channel CH0 is not in use, the channel signal CH0_EN may be transitioned to a high level indicating an idle state.

While the second non-volatile memory device 40_1 is performing the internal operation (t605 to t609), at t607, when the internal operation of the first non-volatile memory device 40_0 is completed, the read first data 6005 may be transmitted to the memory controller 10 through the first channel CH0. Accordingly, since the first channel CH0 is in use, the channel signal CH0_EN may be transitioned to a low level again.

While the first data 6005 is transferred from the first non-volatile memory device 40_0 to the memory controller 10, the internal operation of the second non-volatile memory device 40_1 may be completed t609.

At t607 to t611, since the first data 6005 read from the first non-volatile memory device 40_0 is transmitted to the memory controller 10 through the first channel CH0, at a time t609 when the internal operation of the second non-volatile memory device 40_1 is completed, the read second data 6007 cannot be transmitted to the memory controller 10. That is, the second non-volatile memory device 40_1 may transmit the second data 6007 to the memory controller 10 after the time t611 when the transmission of the first data 6005 is completed. Therefore, in the operation of transmitting the read second data 6007 to the memory controller 10, a timing loss may occur as much as, for example time t609 to t611.

Meanwhile, at t611 to t613, while transmitting the second data 6007 read from the second non-volatile memory device 40_1 to the memory controller 10 through the first channel CH0, at t611, the memory controller 10 may transmit the reading command 611 to the first non-volatile memory device 40_0 based on the request of the host. Also, at t613, the memory controller 10 may further transmit the reading command 613 to the second non-volatile memory device 40_1 based on the request of the host.

Since the first non-volatile memory device 40_0 and the second non-volatile memory device 40_1 are connected to the memory controller 10 through the first channel CH0, the first channel CH0 may transmit the third command 6009 to the first non-volatile memory device 40_0 based on the command of the memory controller 10 after the time t613 when the transmission of the second data 6007 is completed, and the first channel CH0 may transmit the fourth command 6011 to the second non-volatile memory device 40_1 based on the command of the memory controller 10 after the time t615 when the transmission of the third command 6009 is completed. That is, in the operation of transmitting the command from the memory controller 10 to the first and second non-volatile memory devices 40_0 and 40_1, the timing loss may occur as much as, for example time t611 to t613, or time t613 to t615.

As described above, since the first non-volatile memory device 40_0 and the second non-volatile memory device 40_1 are fixedly connected to the first channel CH0, if the traffic to the first and second non-volatile memory device increases, there is a problem that the timing loss occurs during the operation of the memory device. This has a problem in that utilization of the channel is lowered because it cannot be used even when another channel (e.g., second channel CH1) is not in use, that is, in an idle state.

Figure 7:
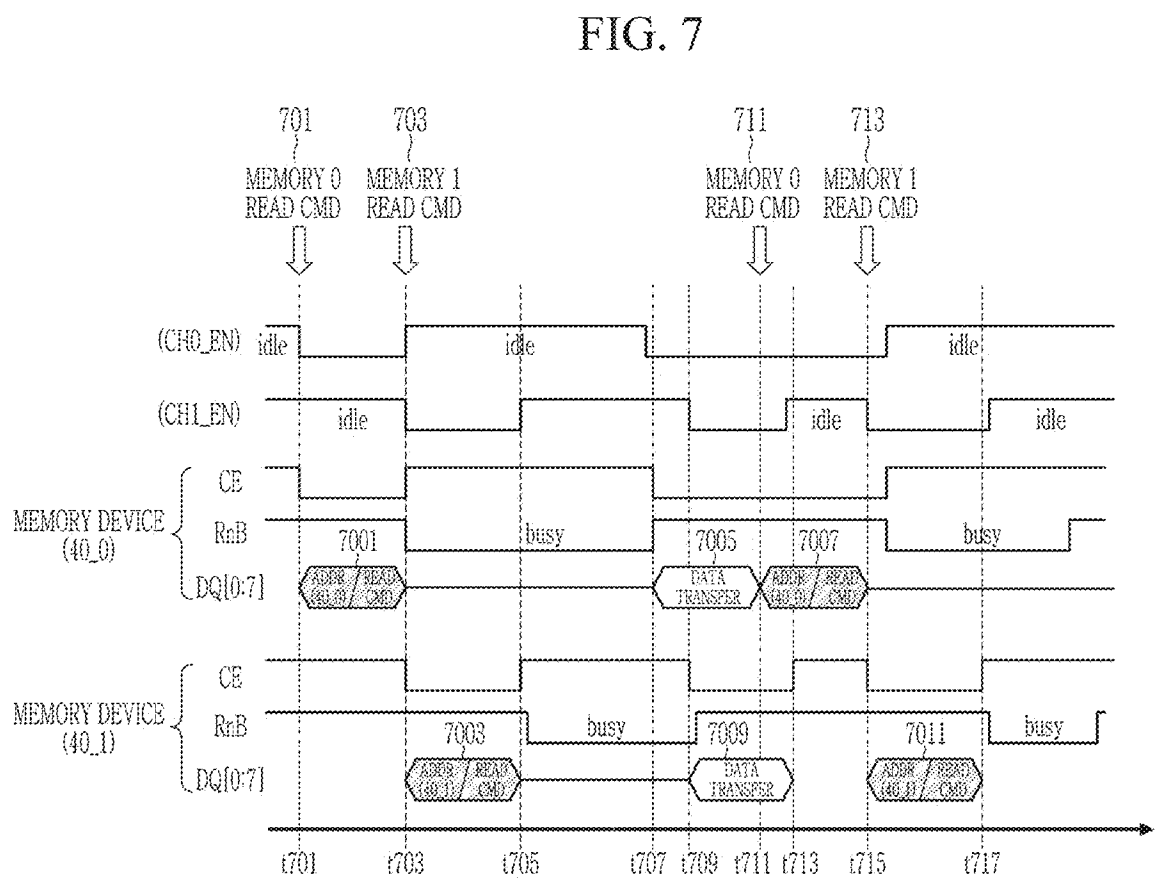

FIG. 7 is a timing diagram illustrating a channel enable signal, an enable signal of a non-volatile memory device, a ready/busy signal, and a data signal during a read operation according to some example embodiments.

At t701, when the host requests the memory controller 10 to perform a reading operation, the memory controller 10 may transmit a reading command 701 to the first non-volatile memory device 40_0 based on the state of the non-volatile memory device 40. At this time, the memory controller 10 may transmit a channel state command to at least one channel among the plurality of channels and receive a channel signal CH0_EN indicating that the first channel CH0 is in an idle state as a response thereto. The memory controller 10 may transmit a channel selection signal SEL instructing to select the first channel CH0 to the first selector 32_0 connected to the first non-volatile memory device 40_0. The first selector 32_0, based on the channel selection signal SEL, may receive the signal corresponding to the command transmitted from the memory controller 10 from the first channel CH0 to be transmitted to the first non-volatile memory device 40_0. Here, the time required for the memory controller to transmit the channel state command to receive the channel signal and to transmit the channel selection signal to the selector, that is, a latency, is negligibly small.

If the first selector 32_0 transmits the signal from the first channel CH0 to the first non-volatile memory device 40_0, the chip enable signal CE of the first non-volatile memory device 40_0 may be transitioned to an enable level (e.g., a low level). While the chip enable signal CE of the first non-volatile memory device 40_0 maintains the low level, the first channel CH0 may transmit the first command 7001 to the first non-volatile memory device 40_0 through the first data signal DQs based on the command of the memory controller 10. While first command 7001 is transmitted from the first channel CH0 to the first non-volatile memory device 40_0, since the first channel CH0 is in use, the channel signal CH0_EN may be transitioned to a low level.

At t703, when the host requests the memory controller 10 to perform a reading operation, the memory controller 10 may transmit the reading command 703 to the second non-volatile memory device 40_1 based on the state of the non-volatile memory device 40. At this time, the memory controller 10 may transmit a channel state command to at least one channel among the plurality of channels and receive a channel signal CH1_EN indicating that the second channel CH1 is in an idle state as a response thereto. The memory controller 10 may transmit a channel selection signal SEL instructing the second selector 32_1 to select the second channel CH1. The second selector 32_1 may receive a signal corresponding to a command transmitted from the memory controller 10 from the second channel CH1 based on the channel selection signal SEL, and transfer the signal to the second non-volatile memory device 40_1. While the second command 7003 is transmitted from the second channel CH1 to the second non-volatile memory device 40_1, since the second channel CH1 is in use, the channel signal CH1_EN may be transitioned to a low level.

At t707, the first data 7005 read in response to the first command 7001 may be transmitted from the first non-volatile memory device 40_0 to the memory controller 10 through the first channel CH0. While the first data 7005 is transmitted to the memory controller 10, since the first channel CH0 is in use, the channel signal CH0_EN may be transitioned to a low level again.

At t709, the second data 7009 read in response to the second command 7003 may be transmitted from the second non-volatile memory device 40_1 to the memory controller 10 through the second channel CH1. That is, the second non-volatile memory device 40_1 may transmit the data to the memory controller 10 regardless of the state of the first channel CH0. Therefore, the timing loss does not occur during the operation of the memory device.

Next, the commands 7007 and 7011 transmitted from the memory controller 10 to the non-volatile memory device may also be transmitted to the non-volatile memory device through a channel selected based on the state of the channel.

Figure 8:
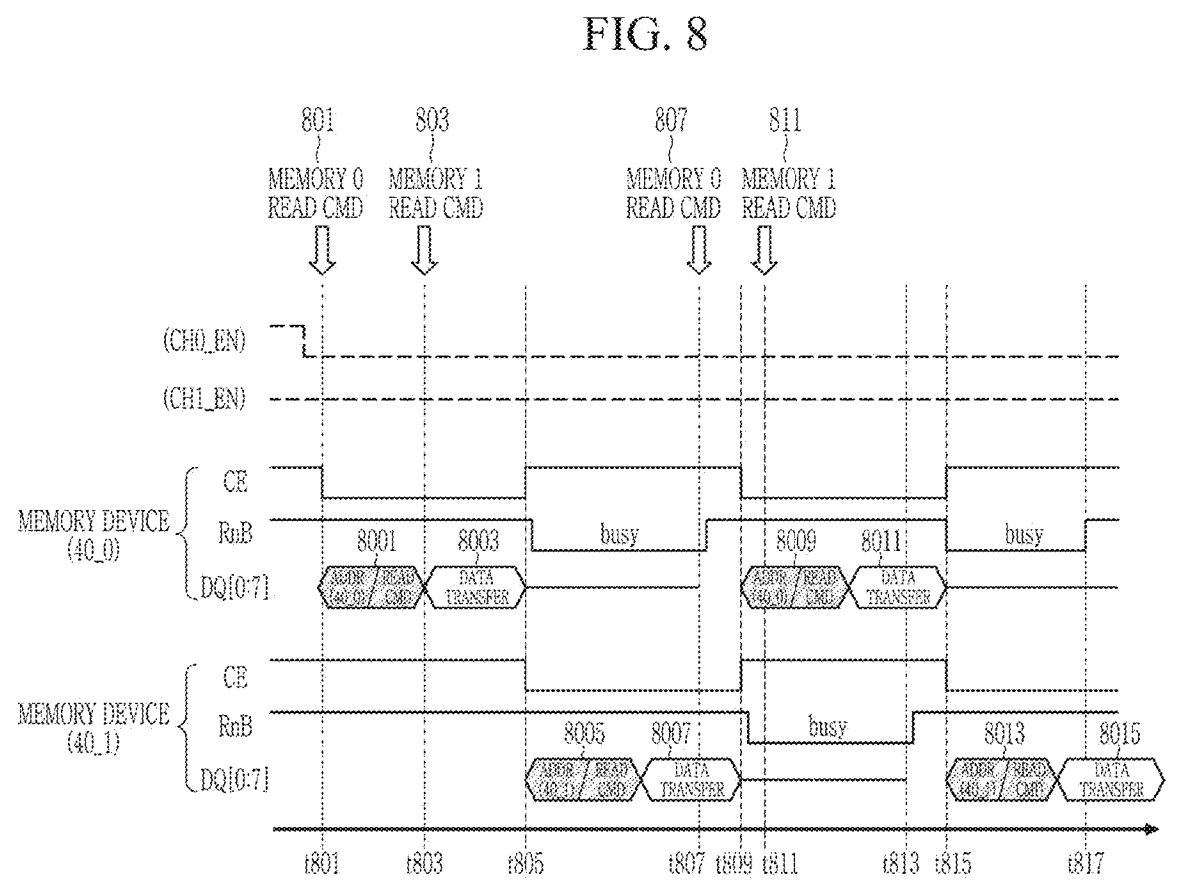

FIG. 8 is a timing diagram showing an enable signal, a ready/busy signal, and a data signal of a non-volatile memory device during a write operation according to a comparative example.

In detail, FIG. 8 is the timing diagram of the enable signal, the ready/busy signal, and the data signal of the non-volatile memory devices 40_0 and 40_1 according to the storage device of FIG. 1. Here, channel signals CH0_EN and CH1_EN are shown for better understanding.

First, at t801, when the host requests the memory controller 10 to perform a write operation, the memory controller 10 may transmit a writing command 801 to the first non-volatile memory device 40_0 based on the state of the non-volatile memory device 40. If the memory controller 10 transmits a writing command to the first non-volatile memory device 40_0, the chip enable signal CE of the first non-volatile memory device 40_0 may be transitioned to an enable level (e.g., a low level).

In FIG. 1, since the first non-volatile memory device 40_0 is connected to the memory controller 10 through the first channel CH0, while the chip enable signal CE maintains the low level, the first channel CH0 may transmit the first command 8001 and the first data 8003 to the first non-volatile memory device 40_0 through the first data signal DQs based on the command of the memory controller 10. The first command 8001 and the first data 8003 may include the address ADDR, the writing command, and the data of the memory array in the first non-volatile memory device 40_0. While the first command 8001 and the first data 8003 are being transferred to the first non-volatile memory device 40_0 (t801 to t805), the first channel CH0 is in use. Accordingly, the channel signal CH0_EN may be transitioned to a low level.

At t803, when the host requests the memory controller 10 to perform a write operation, the memory controller 10 may transmit a writing command 803 to the second non-volatile memory device 40_1 based on the state of the non-volatile memory device 40. However, since the first channel CH0 is in use at t803, the command cannot be transmitted through the first channel CH0.

At t805, if the transmission of the data to the first non-volatile memory device 40_0 is completed, the first channel CH0 may transmit a second command 8005 and a second data 8007 to the second non-volatile memory device 40_1 based on the command of the memory controller 10. That is, in the operation of transmitting the command from the memory controller 10 to the second non-volatile memory device 40_1, the timing loss may occur as much as, for example, time t803 to t805.

Meanwhile, at t807, the memory controller 10 may transmit a writing command 807 to the first non-volatile memory device 40_0 based on the request of the host. However, at t807, since the second non-volatile memory device 40_1 receives the second data 8007 from first channel CH0, first channel CH0 may transmit the address, the command, and the data 8009 and 8011 to first non-volatile memory device 40_0 after the time t809 when the transmission of the second data 8007 is completed. That is, in the operation of transmitting the third command 8009 from the memory controller 10 to the first non-volatile memory device 40_0, the timing loss may occur as much as, for example, a time t807 to t809.

As such, when the plurality of non-volatile memory devices 40_0 and 40_1 are fixedly connected to one channel CH0, there is a problem in which the timing loss occurs as the traffic to the non-volatile memory devices 40_0 and 40_1 increases.

Figure 9:
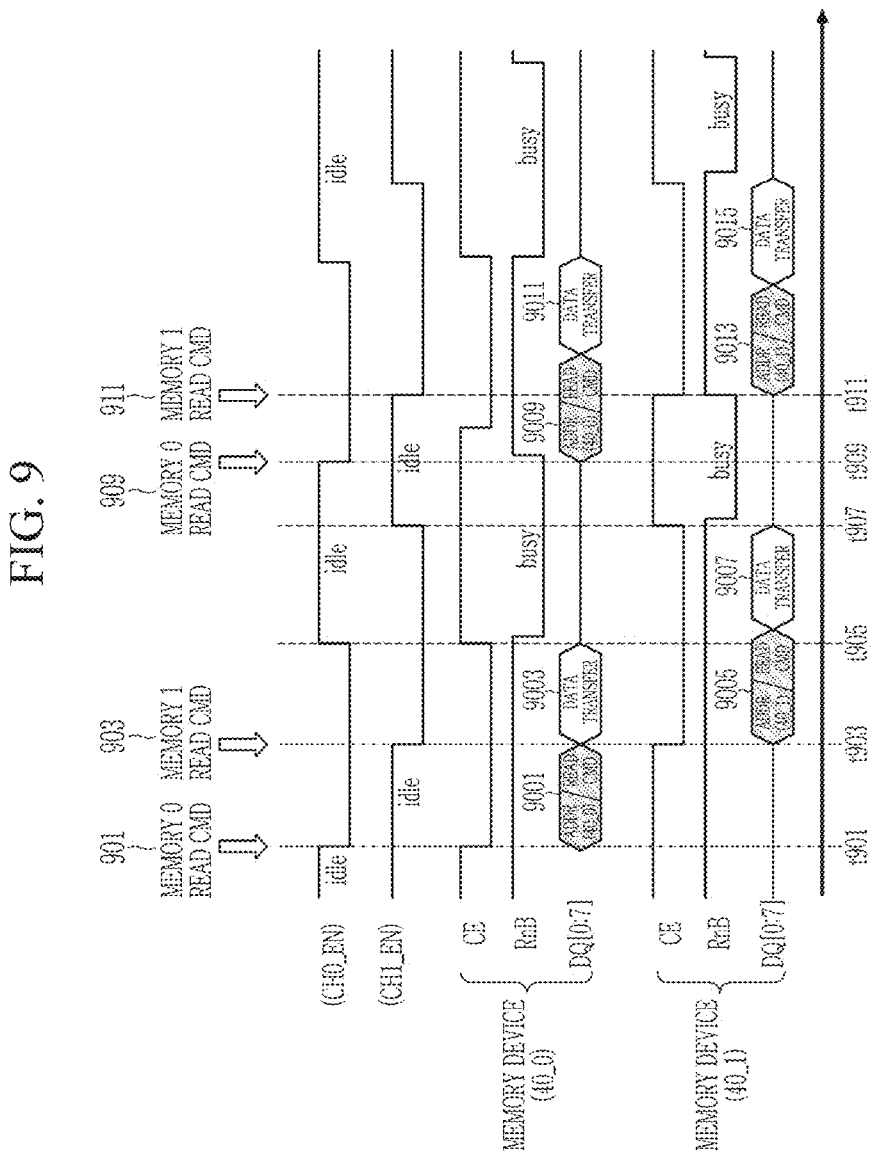
FIG. 9 is a timing diagram showing a channel enable signal, an enable signal of a non-volatile memory device, a ready/busy signal, and a data signal during a write operation according to some example embodiments.

FIG. 9 is a timing diagram showing a channel enable signal, an enable signal of a non-volatile memory device, a ready/busy signal, and a data signal during a write operation according to some example embodiments.

At t901, when the host requests the memory controller 10 to perform a write operation, the memory controller 10 may transmit a writing command 901 to the first non-volatile memory device 40_0 based on the state of the non-volatile memory device 40. At this time, the memory controller 10 may transmit a channel state command and receive a channel signal CH0_EN indicating that the first channel CH0 is in an idle state as a response thereto. The memory controller 10 may transmit a channel selection signal SEL instructing to select the first channel CH0 to the first selector 32_0 connected to the first non-volatile memory device 40_0. The first selector 32_0 may receive a signal corresponding to a command transmitted from the memory controller 10 from the first channel CH0 based on the channel selection signal SEL, and transmit the signal to the first non-volatile memory device 40_0. While the first command 9001 and the first data 9003 are transmitted to the first non-volatile memory device 40_0, since the first channel CH0 is in use, the channel signal CH0_EN may be transitioned to a low level.

At t903, if the host requests the memory controller 10 to perform a write operation, the memory controller 10 may transmit a writing command 903 to the second non-volatile memory device 40_0 based on the state of the non-volatile memory device 40. At this time, the memory controller 10 may transmit a channel state command and receive a channel signal CH1_EN indicating that the second channel CH1 is in an idle state as a response thereto. The memory controller 10 may transmit a channel selection signal SEL instructing to select the second channel CH1 to the second selector 32_1. The second selector 32_1 may receive a signal corresponding to a command transmitted from the memory controller 10 from the second channel CH2 based on the channel selection signal SEL, and transmit the signal to the second non-volatile memory device 40_1.

That is, in the period t903 to t905, the first non-volatile memory device 40_0 may receive a first data 9003 from the first channel CH0, and the second non-volatile memory device 40_1 may receive a second command 9005 and a second data 9007 from the second channel CH1. Therefore, the timing loss does not occur during the operation of the memory device. This is also the same for the operations by the commands 909 and 911 transmitted from the memory controller 10 thereafter.

As shown in FIG. 7 and FIG. 9, the storage device according to some example embodiments has the advantage of reducing the timing loss by increasing the channel utilization and implementing the channel interleaving.

Figure 10:
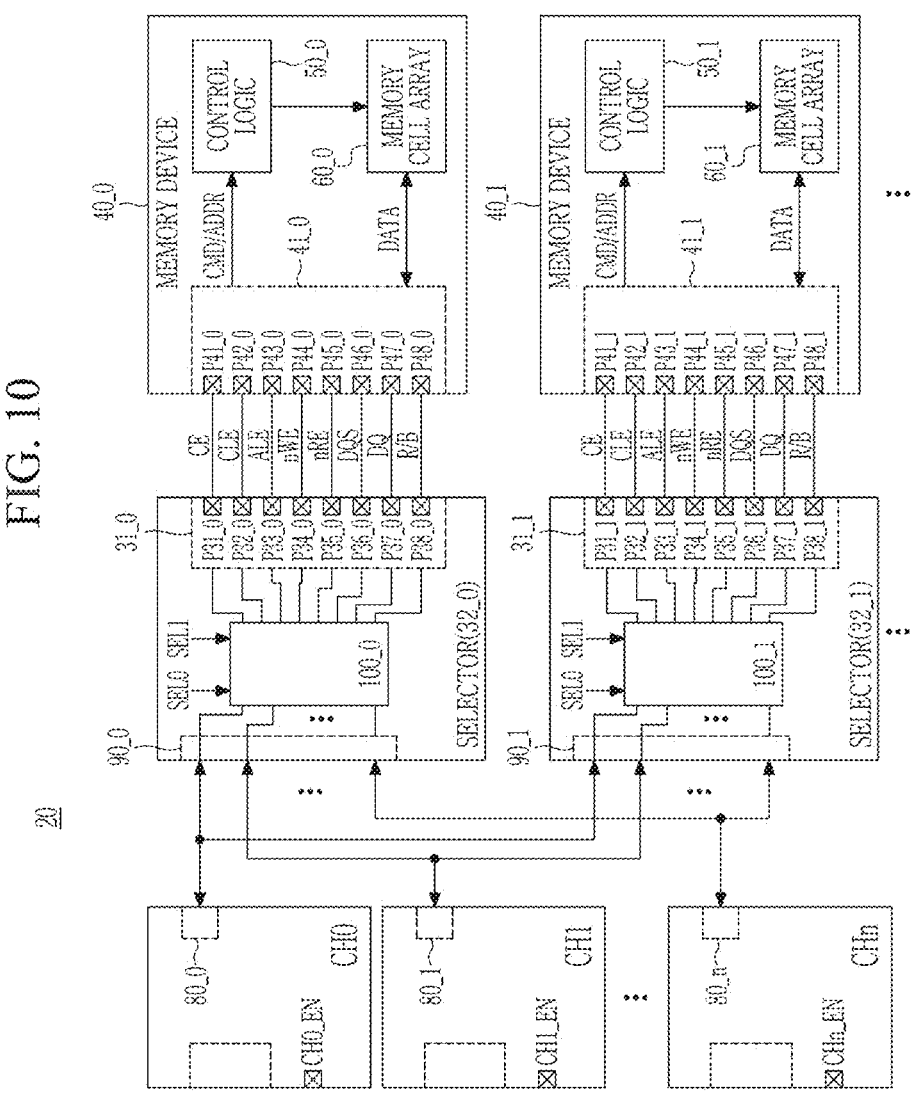
FIG. 10 is a view showing a memory device according to some example embodiments.

FIG. 10 is a view showing a memory device according to some example embodiments.

In some example embodiments, when a sequential/random workload is generated at the request of a user, the host may perform processes corresponding to the sequential/random workload through a processor (processor 12 of FIG. 3) in the memory controller 10. The sequential/random workload may be a pattern of the processes executed by the processor. In some example embodiments, the memory controller 10 may further transmit a workload signal SEL0 notifying the pattern of the workload to the selector 32 based on the workload.

Referring to FIG. 1 together, in a case of a sequential reading/writing operation, since the commands are sequentially assigned to a plurality of non-volatile memory devices 40, the memory devices 20 may execute the commands transmitted from the memory controller 10 without the timing loss. That is, the plurality of non-volatile memory devices may be connected to a predetermined (or, alternatively, desired or determined) channel without connecting the selector 32. However, for a case of a random reading/writing operation, since the commands are randomly assigned to the plurality of non-volatile memory devices 40, the timing loss may occur depending on the state of the channel 30 when the traffic increases in the specific non-volatile memory device 40.

Referring to FIG. 10, in some example embodiments, the selector 32 may change a connection mode between the non-volatile memory device 40 and the channel 30 according to whether the workload is sequential or random. For example, when the memory controller 10 transmits a workload signal SEL0 (e.g., a low level) indicating that the workload is sequential to the plurality of selectors 32 through the data bus, the plurality of selector 32 may connect the non-volatile memory device 40 to the predetermined (or, alternatively, desired or determined) channel CH0, CH1, . . . , CHn as shown in the structure of FIG. 1. That is, the first selector 32_0 may connect the pin connected to the first channel CH0 among the plurality of pins in the first interface 90_0 to the first non-volatile memory device 40_0 through pins P31_0, . . . , P38_0 in the second interface 31_0, and the second selector 32_1 may connect the pin connected to the first channel CH0 among the plurality of pins in the first interface 90_1 to the second non-volatile memory device 40_1 through pins P31_1, . . . , P38_1 in the second interface 31_1.

As another example, if the memory controller 10 transmits a work load signal SEL0 (e.g., a high level) indicating the workload is random to the plurality of selectors 32 through a data but, like the structure of FIG. 4, the plurality of selector 32 may be connected to the plurality of channels 30 in the memory device 20. That is, to transmit the command to the first non-volatile memory device 40_0, the first selector 32_0 may connect the channel CH0, CH1, . . . , CHn of an idle state and the first non-volatile memory device 40_0 based on the channel selection signal SEL1.

Figure 11:
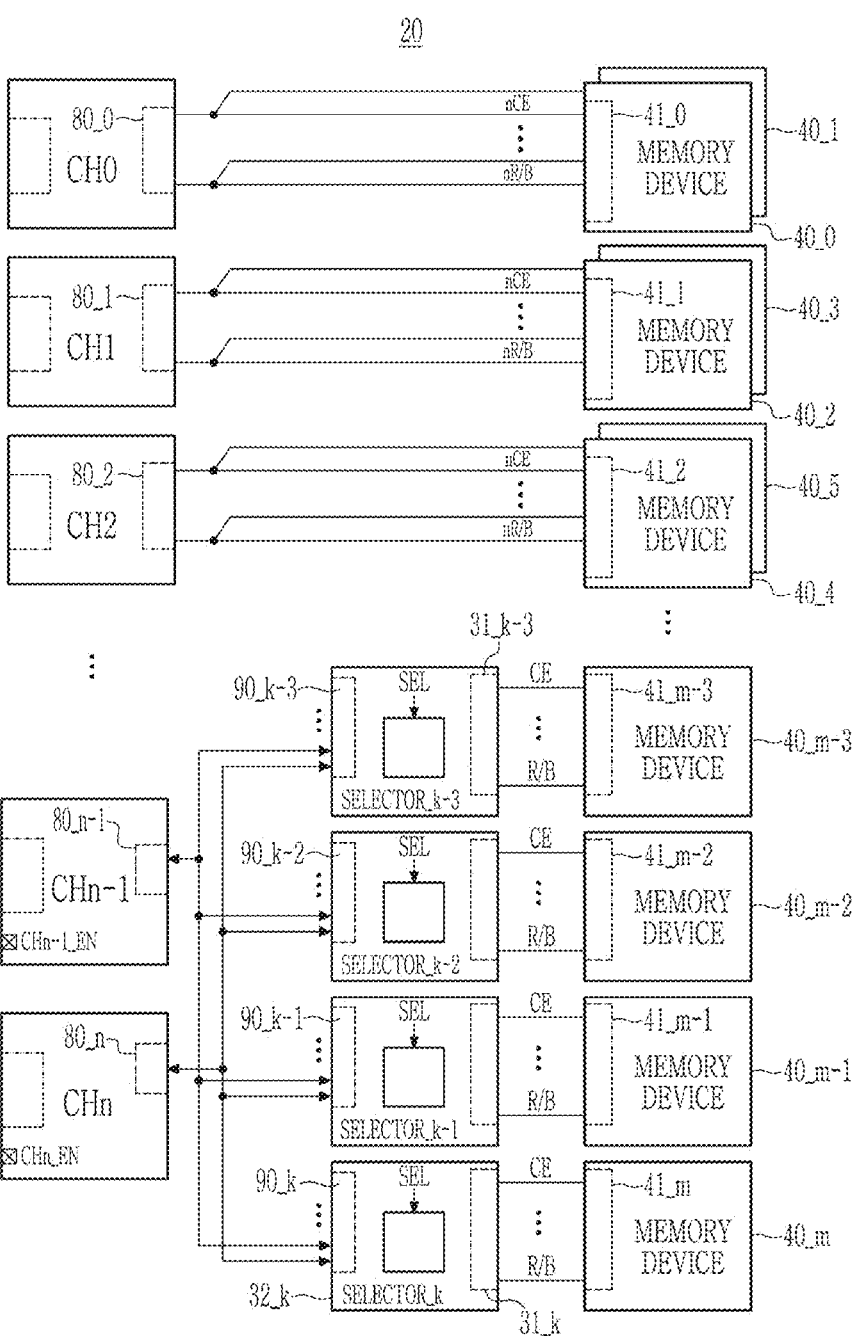
FIG. 11 is a view showing a memory device according to some example embodiments.

FIG. 11 is a view showing a memory device according to some example embodiments.

Referring to FIG. 11, some non-volatile memory devices 40_0, 40_1, . . . of the plurality of non-volatile memory devices are fixedly connected to some channels CH0, CH1, . . . of the plurality of channels, and some non-volatile memory devices 40_(m−3), 40_(m−2), among the plurality of non-volatile memory devices may be connected to some channels CH (n−1) and CHn among the plurality of channels through the selectors 32_(k−3), 32_(k−2), . . . .

In some example embodiments, some non-volatile memory devices 40_0, 40_1, . . . fixedly connected to some channels CH0, CH1, . . . may be operated the same as the storage device 1 of FIG. 1, and some non-volatile memory devices 40_(m−3), 40_(m−2), . . . dynamically connected to some channels CH (n−1) and CHn through the selectors 32_(k−3), 32_(k−2), . . . may be operated the same as the storage device 2 of FIG. 4.

Figure 12:
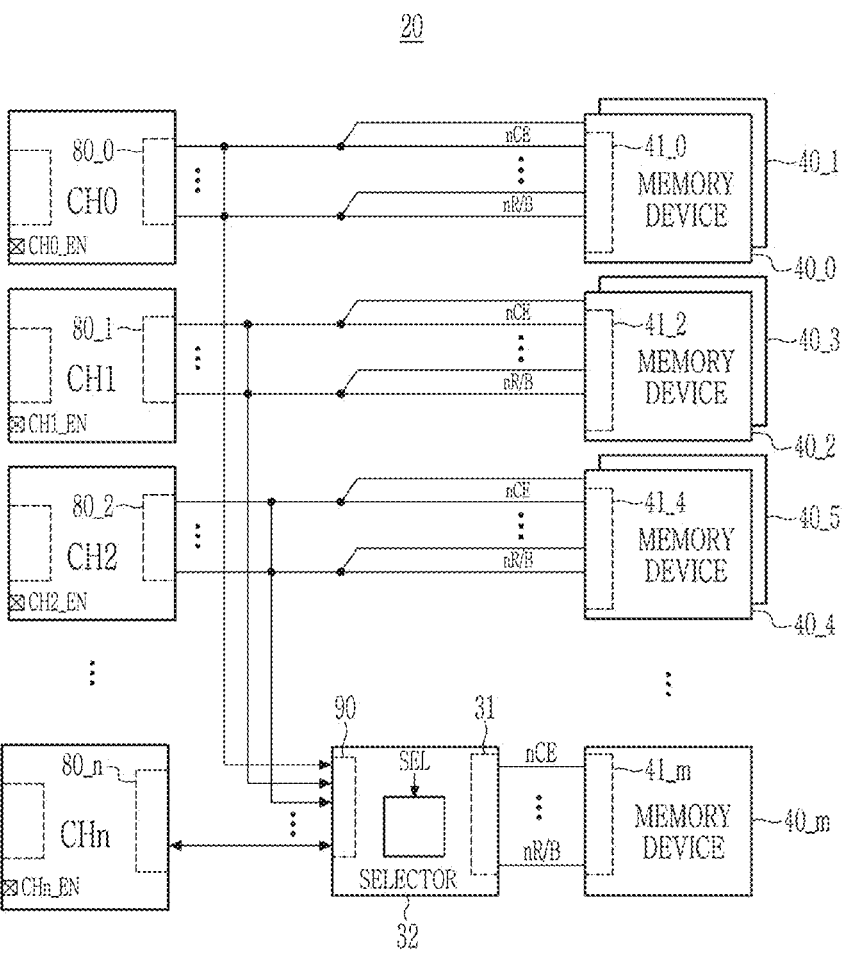
FIG. 12 is a view showing a memory device according to some example embodiments.

FIG. 12 is a view showing a memory device according to some example embodiments

Referring to FIG. 12, some non-volatile memory devices 40_0, 40_1, . . . 40_(m−1) of the plurality of non-volatile memory devices are fixedly connected to some channels CH0, CH1, . . . . CH_(n−1) of the plurality of channels, and the first non-volatile memory device 40_m of the plurality of non-volatile memory device may be connected to the plurality of channels CH0, . . . , CHn through the selector 32.

In some example embodiments, in order to control the non-volatile memory devices 40_0, . . . , 40_(m−1) fixedly connected to the channels CH0, . . . , CH (n−1), some of the plurality of channels CH0, CH1, . . . , CH (n−1) may output the signal corresponding to the command transmitted from the memory controller 10.

In some example embodiments, the selector 32 may be connected to the plurality of channels CH0, . . . , CHn and may be fixedly connected to the first non-volatile memory device 40_m among the plurality of non-volatile memory devices. The memory controller 10 may transmit an operation command to the first non-volatile memory device 40_m based on the state of the non-volatile memory device 40. The memory controller 10 may transmit the channel state command to at least one channel among the plurality of channels and receive the channel signals CH0_EN, . . . , CH_EN as a response thereto. The memory controller 10 may control the operation of the first non-volatile memory device 40 through one channel among the plurality of channels CH0, . . . , CHn based on the channel signal.

The memory device 20 according to FIG. 11 and FIG. 12 has an advantage of reducing a cost by optimizing the number of the selectors 32 and the data lines connected to the selector.

Figure 13:
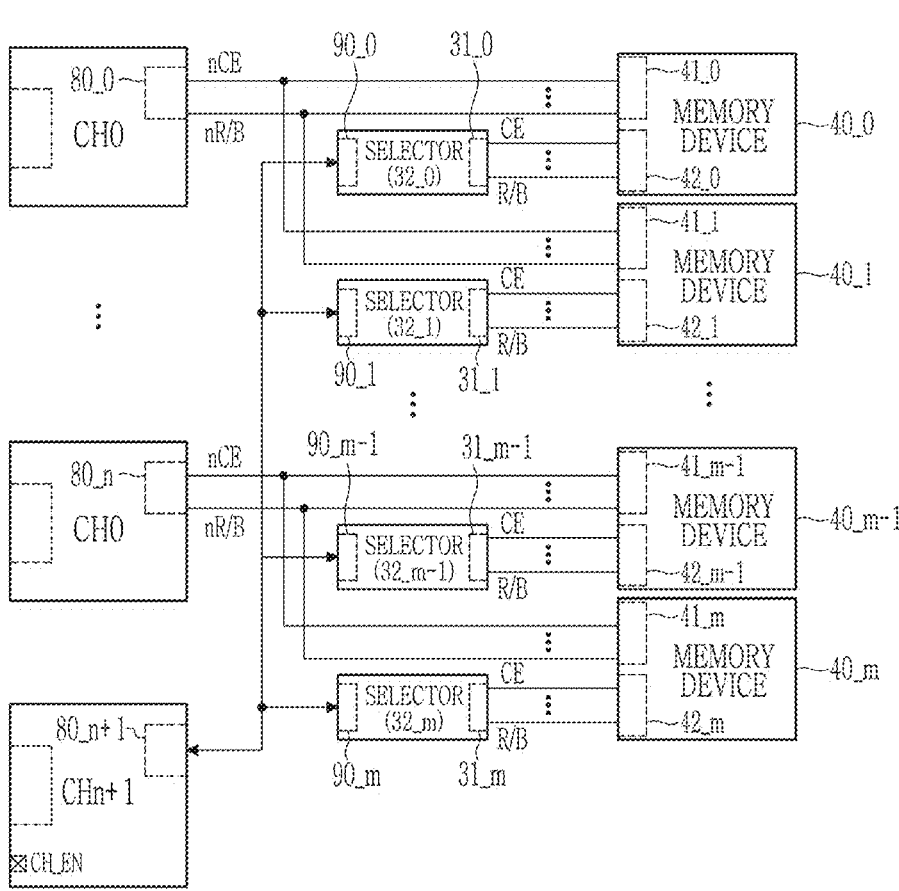
FIG. 13 is a view showing a memory device according to some example embodiments.

FIG. 13 is a view showing a memory device according to some example embodiments.

Referring to FIG. 13, the channels CH0, . . . , CHn and the non-volatile memory devices 40_0, . . . , 40_m satisfy the structure of FIG. 1. That is, this may be a structure in which a plurality of non-volatile memory devices 40_0, . . . , 40_m is fixedly connected to each channel CH0, . . . , CHn. However, in some example embodiments, an extra channel CH (n+1) may be further added in case that a plurality of channels CH0, . . . , CHn are all in use. For example, when the command is transmitted from the memory controller 10 to the non-volatile memory device 40_0, . . . , 40_m, if all of the plurality of channels CH0, . . . , CHn are in use, the command may be transmitted through at least one extra channel CH (n+1) to reduce the timing loss.

In some example embodiments, the non-volatile memory device 40_0, . . . , 40_m may further include an inner interface 42_0, 42_1, . . . , 42_m in addition to the memory inner interfaces 41_0, 41_1, . . . 41_m. Hereinafter, each is referred to as a first memory inner interface 41_0, 41_1, . . . 41_m and a second memory inner interface 42_0, 42_1, . . . , 42_m.

In some example embodiments, the selectors (32_0, 32_1, . . . , 32_m) may be connected to the extra channel (CH(n+1) and may be fixedly connected to the second memory inner interfaces (42_0, 42_1, . . . , 42_m) of the plurality of non-volatile memory devices. When the memory controller 10 wants to transmit the command to the first non-volatile memory device 40_0, in a case that all of the plurality of channels CH0, . . . , CHn are in use, for example, in a case that a chip enable (CE) signal of at least one non-volatile memory device among the plurality of non-volatile memory devices connected to each channel CH0, . . . , CHn is an enable level, or at least one non-volatile memory device among the plurality of non-volatile memory devices connected to each channel CH0, . . . , CHn is in a busy state, the memory controller 10 may use the extra channel CH (n+1). That is, the memory controller 10 may transmit the channel state command to the redundant channel CH (n+1), and receive a channel signal CH_EN indicating that the channel CH (n+1) is in the idle state from the extra channel CH (n+1). Next, the memory controller 10, based on the channel signal CH_EN, may transmit a channel selection signal SEL (not shown) to the first selector 32_0 connected to the first non-volatile memory device 40_0, and instruct to connect the extra channel CH (n+1) and the first non-volatile memory device 40_0.

In some example embodiments, the selector 32_0, 32_1, . . . , 32_m of FIG. 13 may be only connected to the extra channel CH (n+1) unlike the selector of FIG. 2 to FIG. 5, and FIG. 10 to FIG. 12. Accordingly, the selection unit (not shown) in the selector 32_0, 32_1, . . . , 32_m, based on the channel selection signal SEL, may determine whether to connect or not connect the channel CH (n 1) to each non-volatile memory device 40_0, 40_1, . . . , that is, only an on/off (on/off). For example, when the first selector 32_0 receives the channel selection signal SEL to connect the extra channel CH (n 1) and the first non-volatile memory device 40_0 from the memory controller 10, the first selector 32_0 may transmit the command, the address, and the data signal transmitted from the extra channel CH (n+1) to the second memory inner interface 42_0 of the first non-volatile memory device 40_0 through the second interface 31_0. This structure has the advantage of reducing the timing loss by implementing the channel interleaving.

Figure 14:
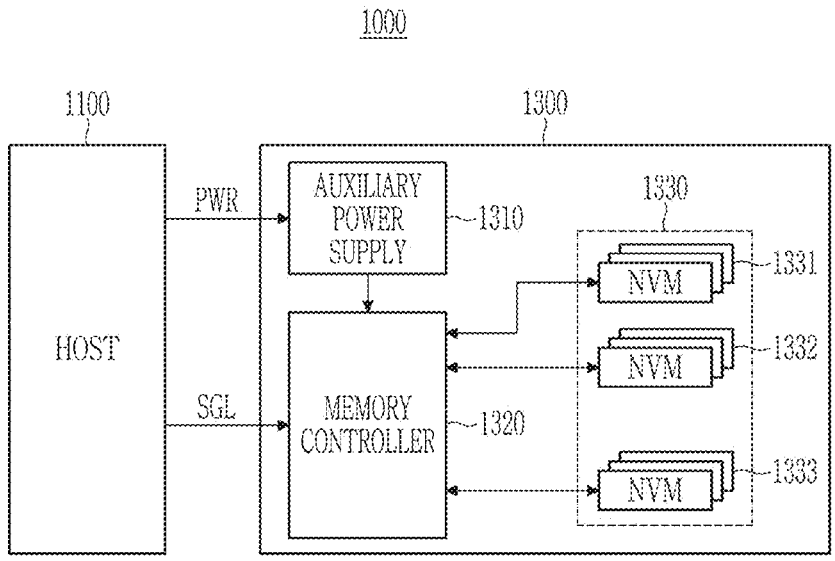
FIG. 14 is a block diagram showing a storage system according to some example embodiments.

FIG. 14 is a block diagram showing a storage system according to some example embodiments.

Referring to FIG. 14, the storage system 1000 may include a host 1100 and a storage device 1300. The storage device 1300 transmits and receives signals with the host 1100 through a signal connector, and receives a power through a power connector. The storage device 1300 may include a memory controller 1320, an auxiliary power supply 1310, and memory devices 1331, 1332, . . . , 133n. The memory devices 1331, 1332, . . . , 133n may be a NAND flash memory device. According to the embodiment, the arbitrary memory device 1331, 1332, . . . , 133n may include a plurality of selectors according to FIG. 2 to FIG. 5 and FIG. 10 to FIG. 13.

In some example embodiments, the arbitrary memory device 1331, 1332, . . . , 133n may be connected to the memory controller 1320 through a plurality of channels. In some example embodiments, a plurality of selectors in the arbitrary memory device 1331, 1332, . . . , 133n may be connected to a plurality of channels.

In some example embodiments, the memory controller 1320 may transmit a state reading command to the plurality of memory devices 1331, 1332, . . . , 133n to detect the state of each of the plurality of memory devices 1331, 1332, . . . , 133n. In addition, the memory controller 1320 may transmit a channel state command to the plurality of channels in order to detect the states of the channels connected to the plurality of memory devices 1331, 1332, . . . , 133n. In some example embodiments, the memory controller 1320 may transmit the channel signal indicating the channel state to the plurality of selectors in the plurality of memory devices 1331, 1332, . . . , 133n based on the state of the channel. In some example embodiments, the plurality of selectors may connect one channel of the plurality of channels and one memory device of the plurality of memory devices based on the channel signal.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

As above, some example embodiments have been disclosed in drawings and specifications. Although the example embodiments have been described using specific terms in this specification, they are only used for the purpose of explaining the technical ideas of the present disclosure, and are not used to limit the meaning or scope of the present disclosure described in the claims. Therefore, a person of an ordinary skill in the art will understand that numerous variations and equally other embodiments are possible from this. Therefore, the true technical protection range of the present disclosure should be determined by the technical spirit of the appended claims range.

What is claimed is:

1. A storage device comprising:
a memory controller configured to control age device;
a plurality of channels connected to the memory controller;
non-volatile memory devices configured to store data, the non-volatile memory devices including a first non-volatile memory device; and
selectors each connected to a respective one of the non-volatile memory devices, the selectors including a first selector connected between the first non-volatile memory device and the plurality of channels;
wherein each of the plurality of channels is configured to connect the memory controller to a respective ones of the selectors independent of other ones of the selectors without interference of the other ones of the selectors, the memory controller is configured to
transmit a command for sensing a state of a channel to the plurality of channels in order to transmit the data to the first non-volatile memory device,
receive a channel state signal indicating whether each channel is in an idle state or not from the plurality of channels as a response to the command,
select a first channel among the plurality of channels based on the channel state signal, and
output a channel selection signal including an information of the first channel to the first selector so that the first selector connects the first channel and the first non-volatile memory device, and
wherein the first channel is in the idle state.

2. The storage device of claim 1, wherein:
the first selector, upon receiving the channel selection signal from the memory controller, is configured to receive a signal corresponding to the data from the first channel and transmit the signal to the first non-volatile memory device.

3. The storage device of claim 1, further comprising:
a second non-volatile memory device of the non-volatile memory devices fixed and connected to the first channel.

4. The storage device of claim 1, wherein:
the storage device further includes
a second non-volatile memory device of the non-volatile memory devices configured to store data,
a second selector of the selectors connected between the second non-volatile memory device and the plurality of channels,
the memory controller is configured to schedule a transmission order of the data to be transmitted to the first non-volatile memory device and the second non-volatile memory device based on a scheduling scheme.

5. The storage device of claim 4, wherein:
the scheduling scheme is configured to determine the transmission order of the data to be transmitted to the first non-volatile memory device and the second non-volatile memory device based on whether the first non-volatile memory device and the second non-volatile memory device are in a busy state in which internal operations are performed or in a ready state in which the internal operations are completed.

6. The storage device of claim 1, wherein:
the memory controller is further configured to output a workload signal indicating a pattern of a workload of the memory controller.

7. The storage device of claim 6, wherein:
the first selector is further configured to
receive the workload signal, and
change a connection mode of the plurality of channels and the first non-volatile memory device based on the workload signal.

8. A memory device comprising:
a plurality of channels;
a plurality of non-volatile memory devices; and
selectors including a first selector connected between a first non-volatile memory device-among the plurality of non-volatile memory devices and the plurality of channels, the first selector configured to receive a first signal from an external memory controller, and connect a first channel among the plurality of channels and the first non-volatile memory device based on the first signal,
each of the plurality of channels configured to communicate with each of the plurality of non-volatile memory devices independent of other ones of the plurality of channels without interference of the other ones of the selectors, and
wherein the first signal is a signal indicating the first channel being in an idle state among the plurality of channels.

9. The memory device of claim 8, further comprising:
a second selector of the selectors connected between a second non-volatile memory device corresponding among the plurality of non-volatile memory devices and the plurality of channels, the second selector configured to receive a second signal from an outside, and connect a second channel among the plurality of channels and the second non-volatile memory device based on the second signal.

10. The memory device of claim 9, wherein:
the first selector is configured to connect the first channel among the plurality of channels and the first non-volatile memory device based on the first signal, receive a first command from the first channel to be transmitted to the first non-volatile memory device, and transmit a first data output from the first non-volatile memory device by corresponding to the first command, and
the second selector is configured to connect the second channel among the plurality of channels and the second non-volatile memory device based on the second signal, receive a second command from the second channel to be transmitted to the second non-volatile memory device, and while the first data is transmitted from the first non-volatile memory device to the first channel, transmit a second data output from the second non-volatile memory device to the second channel by corresponding to the second command.

11. The memory device of claim 10, wherein:
the first selector is configured to receive a third signal from the outside and connect a third channel among the plurality of channels and the first non-volatile memory device based on the third signal.

12. The memory device of claim 11, wherein:
after the first data is transferred from the first non-volatile memory device to the first channel, while the second data is transferred from the second non-volatile memory device to the second channel, the first selector is configured to connect the third channel among the plurality of channels and the first non-volatile memory device based on the third signal, receive a third command from the third channel to be transmitted to the first non-volatile memory device, and transmit a third data output from the first non-volatile memory device to the third channel by corresponding to the third command.

13. The memory device of claim 8, wherein:
a second non-volatile memory device among the plurality of non-volatile memory devices is fixedly connected to a second channel among the plurality of channels.

14. The memory device of claim 8, wherein:
the first non-volatile memory device includes
    a first plurality of pins connected to the first selector and configured to receive data from the first selector; and
    a second plurality of pins connected to a second channel among the plurality of channels and configured to receive data from the second channel.

15. The memory device of claim 14, wherein:
a second non-volatile memory device among the plurality of non-volatile memory devices further includes
    a third plurality of pins connected to a second selector corresponding to the second non-volatile memory device and configured to receive data from the second selector, and
    a fourth plurality of pins connected to the second channel among the plurality of channels and configured to receive data from the second channel.

16. The memory device of claim 8, wherein:
the first signal is a signal instructing a pattern of a first workload among a plurality of workload patterns.

17. An operating method of a storage device comprising:
determining, by a memory controller, to transmit & data to a first non-volatile memory device among a plurality of non-volatile memory devices based on a scheduling scheme;
for transmitting the data to the first non-volatile memory device, selecting a channel through which the data is transmitted among a plurality of channels connected to the memory controller, and outputting a channel selection signal including an information of the selected channel; and
receiving the channel selection signal by a first selector among a plurality of selectors connected between the first non-volatile memory device and the plurality of channels, and connecting the channel corresponding to the channel selection signal and the first non-volatile memory device based on the channel selection signal independent of other ones of the plurality of selectors without interference of the other ones of the plurality of selectors, wherein: the channel is in an idle state.

18. The operating method of the storage device of claim 17, wherein the selecting of the channel through which the data is transmitted among the plurality of channels includes:
    transmitting, by the memory controller, a command for sensing a state of the channel to at least one channel among the plurality of channels; and
    receiving a channel state signal indicating whether each channel is in an idle state or not from at least one channel among the plurality of channels as a response to the command.

\* \* \* \* \*